United States Patent
Kravtsov

(10) Patent No.: US 7,692,503 B2
(45) Date of Patent: Apr. 6, 2010

(54) RANDOM NUMBER GENERATOR BASED ON OSCILLATOR NOISE

(75) Inventor: Alexander Kravtsov, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 11/728,083

(22) Filed: Mar. 23, 2007

(65) Prior Publication Data

US 2008/0231377 A1    Sep. 25, 2008

(51) Int. Cl.
*H03B 29/00* (2006.01)
*G06F 7/58* (2006.01)
*H03K 3/01* (2006.01)

(52) U.S. Cl. .............................. 331/78; 331/46; 708/251
(58) Field of Classification Search ................... 331/78, 331/46; 708/251
See application file for complete search history.

(56) References Cited

U.S. PATENT DOCUMENTS

| 4,694,412 | A * | 9/1987 | Domenik et al. ............. 708/251 |
| 5,961,577 | A | 10/1999 | Soenen et al. |
| 2003/0025527 | A1 | 2/2003 | Porter et al. |
| 2003/0037079 | A1 | 2/2003 | Wilber |
| 2003/0135527 | A1 | 7/2003 | Lundberg |
| 2006/0129848 | A1 * | 6/2006 | Paksoy et al. ............... 713/193 |
| 2007/0011217 | A1 | 1/2007 | Kim |

FOREIGN PATENT DOCUMENTS

CN            1752924          3/2006

OTHER PUBLICATIONS

Benjamin Jun et al., "The Intel Random Number Generator", Cryptography Research Inc., White Paper Prepared for Intel Corporation, Apr. 22, 1999, 8 pages
Office Action for Chinese Patent Application No. 200810096332.9 mailed Jul. 17, 2009, 6 pgs.
Office Action for United Kingdom Patent Application No. GB0805404.1 mailed Aug. 1, 2008, 11 pgs.
Office Action for United Kingdom Patent Application No. GB0805404.1 mailed Sep. 10, 2009, 3 pgs.

* cited by examiner

*Primary Examiner*—Joseph Chang
(74) *Attorney, Agent, or Firm*—Blakely, Sokoloff, Taylor & Zafman LLP

(57) ABSTRACT

Embodiments of the invention are generally directed to systems, methods, and apparatuses for a random number generator (RNG) based on oscillator noise. In some embodiments, the RNG buffers effects of thermal noise from two independent oscillators impacted by effects of pseudo-stochastic processes and separates thermal noise from other effects. The RNG may then convert the thermal noise to a stochastic binary sequence based, at least in part, on a digital signal processing algorithm.

16 Claims, 4 Drawing Sheets

US 7,692,503 B2

RANDOM NUMBER GENERATOR BASED ON OSCILLATOR NOISE

TECHNICAL FIELD

Embodiments of the invention generally relate to the field of integrated circuits and, more particularly, to systems, methods and apparatuses for a random number generator based on oscillator noise.

BACKGROUND

Cryptographic techniques, in general, require the generation of a random number to provide a secret value that is unknown to an attacker. For example, random numbers are used to generate the public/private key pairs used in algorithms such as RSA. Random numbers are used for a wide variety of other cryptographic purposes including challenges, nonces, and the like.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for a random number generator based on oscillator noise. In some embodiments, a true random number generator (TRNG) is provided without the need for dedicated TRNG hardware. Instead of a dedicated hardware, embodiments of the invention may use existing system clocks to provide a source of entropy. As is further described below, in some embodiments, the TRNG employs digital signal processing (DSP) to assure that the random bits are solely the output of the physical stochastic nature of an oscillator (e.g., the system clocks).

Figure 1:
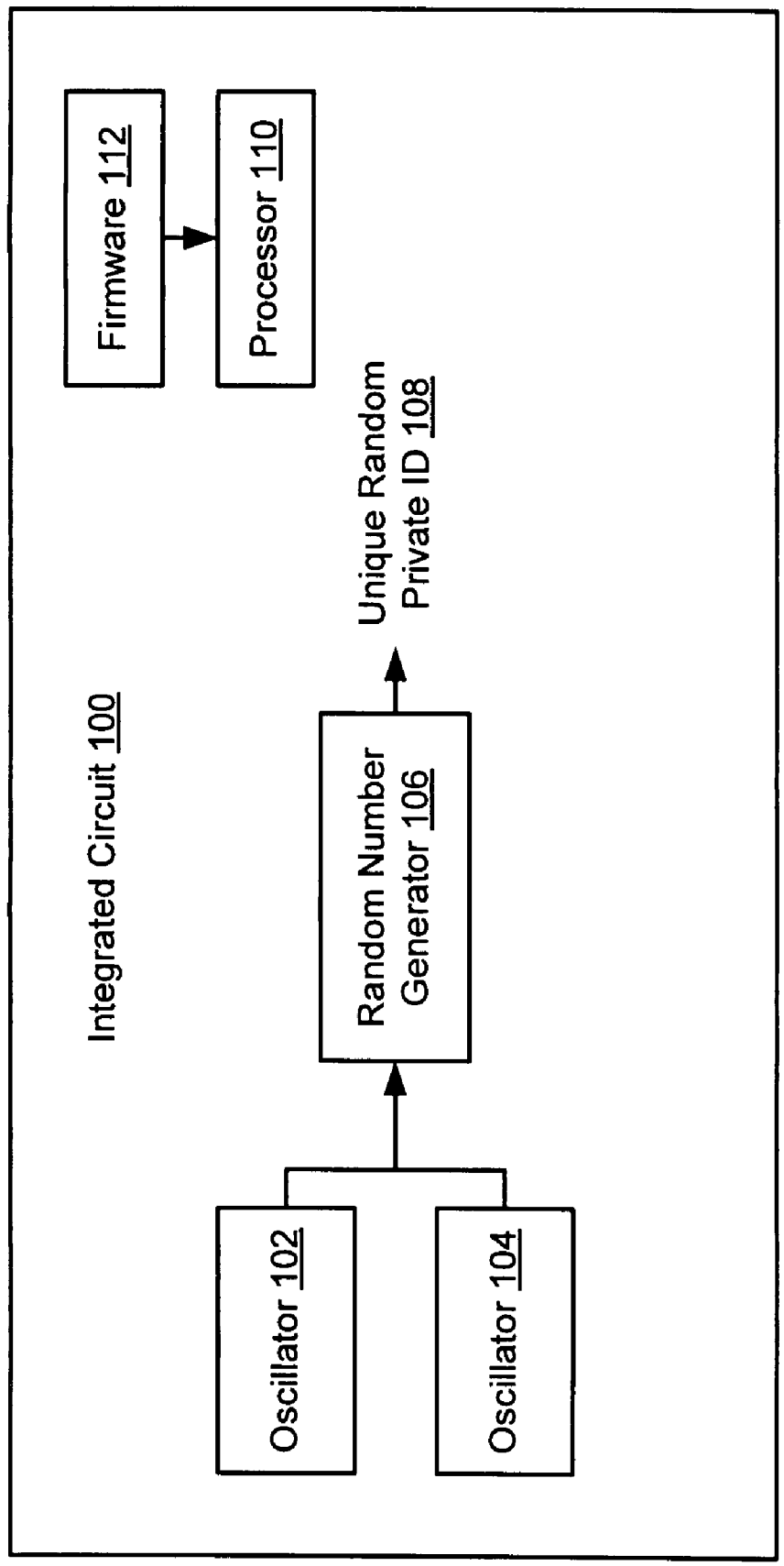
FIG. 1 is a high-level block diagram illustrating selected aspects of an integrated circuit implemented according to an embodiment of the invention.

FIG. 1 is a high-level block diagram illustrating selected aspects of an integrated circuit implemented according to an embodiment of the invention. Integrated circuit (IC) 100 may be, for example, part of the chipset for a computing system. IC 100 includes, inter alia, two oscillators (102 and 104) and a RNG 106. In some embodiments, IC 100 may include more elements, fewer elements, and/or different elements than those shown in FIG. 1.

In some embodiments, oscillators 102 and 104 are general purpose oscillators in the sense that they are not dedicated to RNG 106. For example, oscillators 102 and 104 may provide system clocks to various functional units of IC 100 (e.g., processor 110). Oscillators 102 and 104 must be independent from each other, thus they may be provided by independent hardware (such as independent crystals).

In some embodiments, RNG 106 provides random numbers that may be used as unique random private identifiers. The unique random private identifiers may support a number of functions including cryptographic features such as public/private key pairs (e.g., in RSA algorithms). As is further described below with reference to FIGS. 2-3, RNG 106 may employ a two-stage algorithm to generate the unique random private identifiers. In some embodiments, the first stage involves separating the difference between the oscillators' thermal noise form other characteristics. The second stage may involve converting the thermal noise to a stochastic binary sequence.

In some embodiments, selected aspects of RNG 106 are implemented in firmware (e.g., firmware 112). The firmware may be executed by a processor integrated onto IC 100 (e.g., processor 110). In alternative embodiments, firmware 112, processor 110, and/or oscillators 102 and 104 may be located on two or more separate integrated circuits. Firmware 112 may be stored in any of a wide-range of non-volatile memories including, for example, flash, erasable programmable read-only memory (EPROM), electrically erasable programmable read-only memory (EEPROM), and the like. Processor 110 may be any of wide range of processing elements including a service processor, a management processor, a general purpose processor, and the like.

Figure 2:
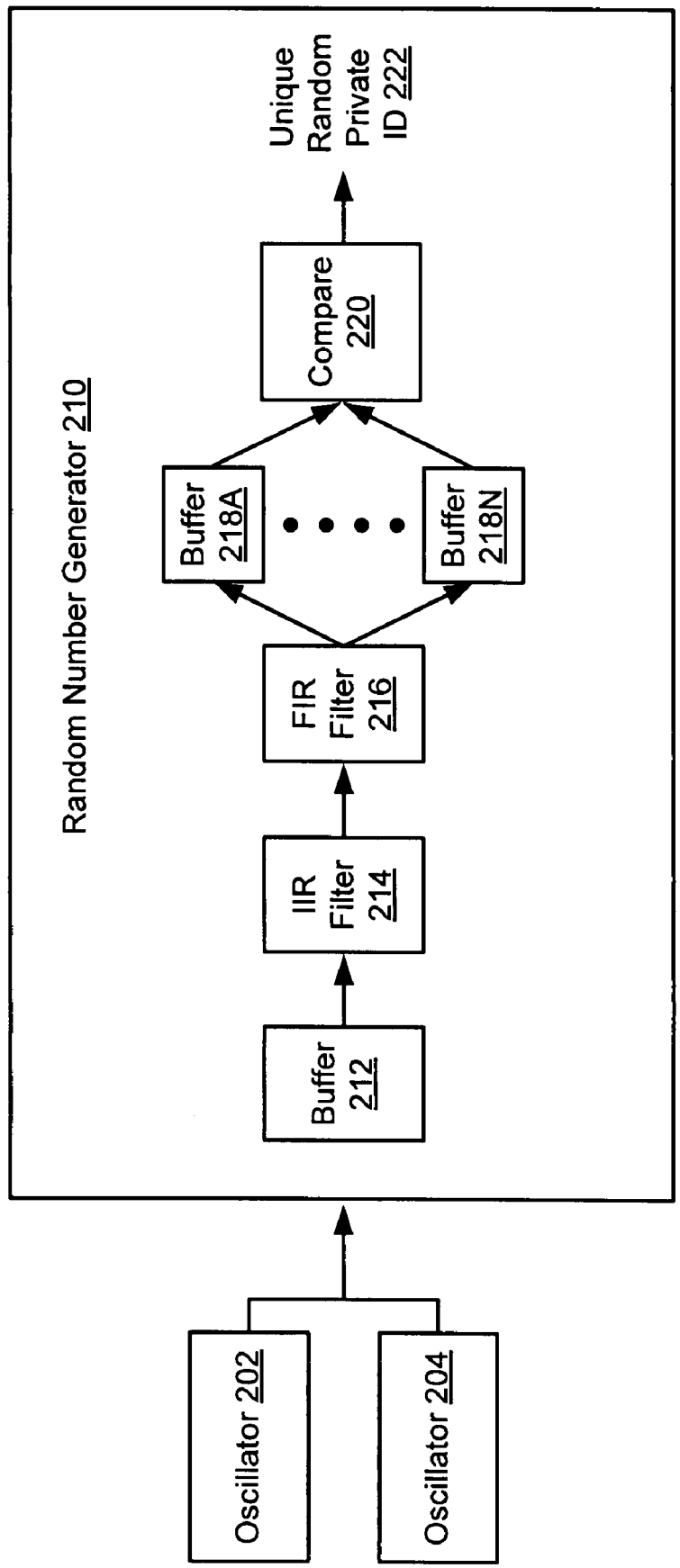
FIG. 2 is a block diagram illustrating selected aspects of computing system, implemented according to an embodiment of the invention.

FIG. 2 is a block diagram illustrating selected aspects of computing system 200, implemented according to an embodiment of the invention. System 200 includes oscillators 202 and 204 as well as random number generator 210. In alternative embodiments, system 200 may include more elements, fewer elements, and/or different elements.

The difference between oscillators 202 and 204 provides a source of entropy for random number generator 210. For example, oscillators 202 and 204 may provide a source of thermal noise. In some embodiments, one oscillator (e.g., 202) acts as a timer to specify a period during which the number of oscillations on the other oscillator (e.g., 204) is counted. Oscillators 202 and 204 may be general purpose oscillators. For example, they may be the oscillators that provide different system clocks to different elements of system 200. In some embodiments, oscillators 202 and 204 are independent on the hardware level. Oscillators 202 and 204 are based on independent crystals.

Random number generator 210 collects the numbers of the counted oscillation of the oscillator 204 into buffer 212 (see, e.g., sections 1-3 of the example code shown below). The sequence of the above mentioned numbers we call the measured noise. The measured noise may include a mix of truly stochastic process (e.g., thermal noise) and pseudo-stochastic process (e.g., "dicretization noise", "substrate noise", etc.). Random number generator 210 separates the thermal noise from the pseudo-stochastic processes using digital signal processing (DSP). In some embodiments, random number generator 210 uses a DSP filter to obtain a frequency band having "high" ratio of thermal noise power to the power of pseudo-stochastic process (say, the ratio=100 is high). We will call this frequency band "thermal noise band". In the illustrated embodiment, infinite impulse response (IIR) filter 214 is used to flatten the power spectrum of the thermal noise and thus to simplify its further processing. Section 4 of the example code shown below provides an example of IRR filter 214, according to some embodiments. In alternative embodiments, different techniques may be used to flatten the spectrum of the thermal noise. In some embodiments, the measured noise has the constant bias which may be subtracted from the sequence.

In some embodiments, the thermal noise band may be split (or separated) into N sub-bands using DSP. The N sub-bands may have little overlap (e.g., less than 1% of power). Thus, the N sub-bands provide N non-correlated complex Gaussian channels that are stochastically independent. In the illustrated embodiment, finite impulse response (FIR) filter 216 splits the thermal noise band into N (e.g., 4) sub-bands. While FIG. 2 uses a single block to illustrate FIR filter 216, it is to be appreciated that, in some embodiments, there may be N FIR filters 216. Section 5 of the example code shown below provides an example of FIR filter 216, according to some embodiments. In alternative embodiments, different techniques may be used to split the band of thermal noise. In some embodiments, the elements of each sub-band are stored in a respective buffer 218.

In some embodiments, compare logic 220 converts the sub-band elements stored in buffers 218 to a Boolean sequence. For example, compare logic 220 may compare the real and imaginary parts of each sub-band element to zero to create the Boolean sequence. In alternative embodiments, a different operation may be used to generate the Boolean sequence. Compare logic 220 may be allowed to run as long as necessary to create a Boolean sequence of desired length to create unique random private identifier 222. The length of unique random private identifier 222 is arbitrary and may merely be a function of the length of time that compare logic 220 is allowed to run.

In some embodiments, selected aspects of random number generator 210 are implemented in firmware (e.g., firmware 112, shown in FIG. 1). In such embodiments, the features implemented in firmware may be executed by a processor (e.g., processor 110, shown in FIG. 1). For example, buffer 212, IIR filter 214, FIR filter 216, buffers 218, and/or compare logic 220 may be implemented as firmware that is executed on a processor.

EXAMPLE CODE

```
%Section 1 we load the data measured on real platform and saved to file:
bin=(-256:256);
inp=fopen('decimal1.txt','rt'); x=fscanf(inp,'%d'); fclose(inp);
x=x(1:end-1);%last code is wrong
%Section 2 calculate delta of measurements
y=diff(x); N=length(y);
N=length(y);
y1=y+256*(y<-100);
%Section 3 remove abnormal measurements,
y2=(y1-mean(y1)).*(abs(y1-mean(y1))<10);
%Section 4 recalculate mean value
z0=y2-mean(y2);
% Section 5 apply IIR filter on signal
a=1/32; aa=1-a; num=[-aa aa]; den=[1 -aa]; %IIR filter creation
z1=filter(num,den,z0); %z1 is the filtered signal
z1=z1(100:end-100);
%Section 6 creating 4 FIR filters with 4 different freq bands
and applying on Z1
Nfft=1024;
w=chebwin(Nfft+2,35); w=w(2:end-1);
N=floor(length(z1)/Nfft);
bit=zeros(1,8*N);
%Section 7 generating 8 bits for each 1024 samples, by comparing Re and
Im of each filtered output with 0; These independent stochastic values
for (k=0:N-1)
    ft=fft(w.*z1(1+k*Nfft:(k+1)*Nfft));
    bit(1+8*k+(0:3))=(real(ft(3+3*(0:3)))>0);
    bit(1+8*k+(4:7))=(imag(ft(3+3*(0:3)))>0);
end;
```

Figure 3:
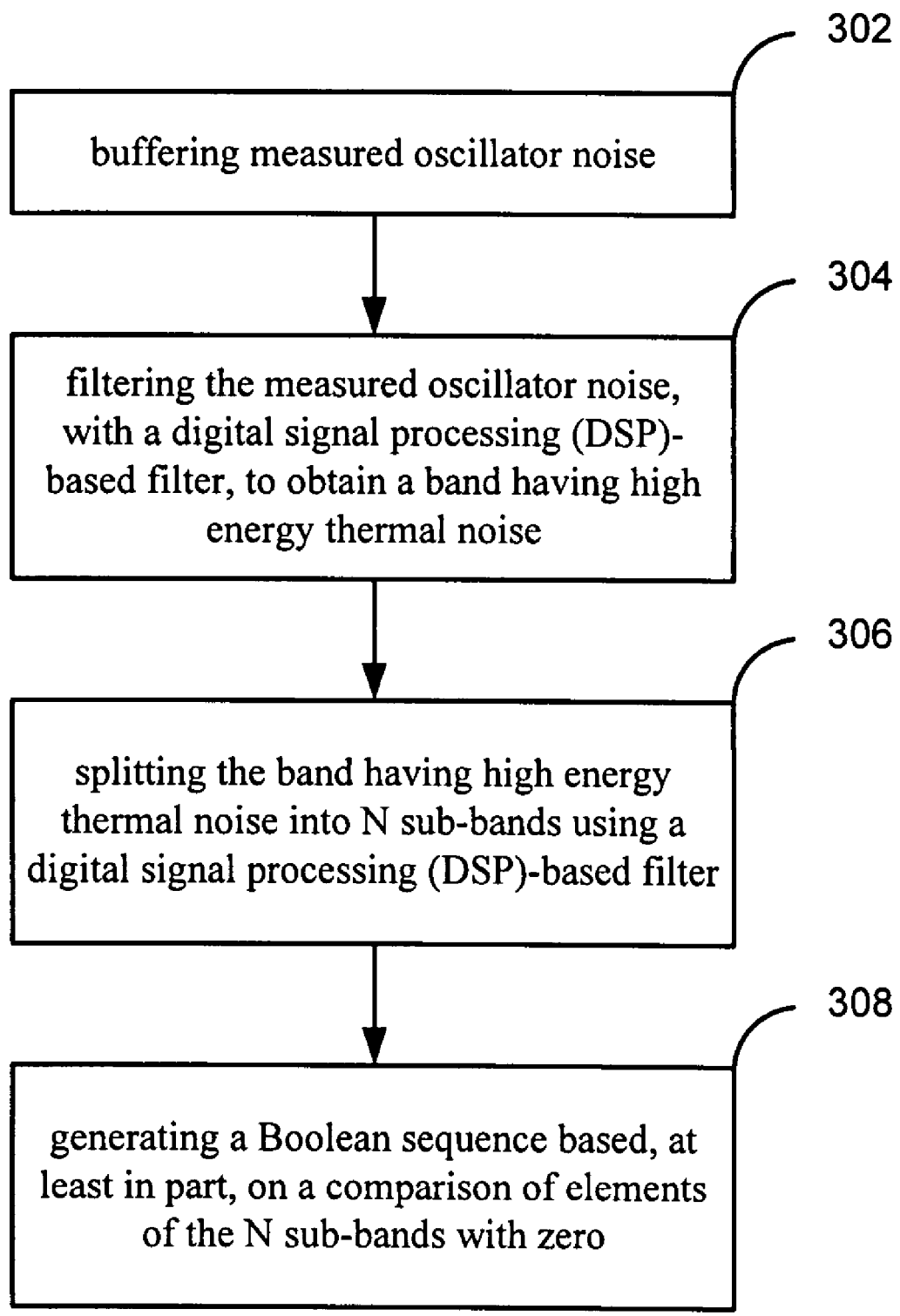
FIG. 3 is a flow diagram illustrating selected aspects of the operation of a random number generator, implemented according to an embodiment of the invention.

FIG. 3 is a flow diagram illustrating selected aspects of the operation of a random number generator, implemented according to an embodiment of the invention. Referring to process block 302, the measured noise is buffered. In some embodiments, the measured noise provides a source of entropy. For example, in some embodiments, the measured noise includes a mix of truly stochastic process (e.g., thermal noise) and pseudo-stochastic process. The buffers may be implemented in firmware (e.g., section 1 of the example code) that executes on a processor (e.g., processor 110, shown in FIG. 1).

Referring to process block 304, the thermal noise is separated from the pseudo-stochastic process using DSP. For example, an IIR filter may flatten the thermal noise. In some embodiments, the IIR filter (or other suitable DSP operation) may be implemented in firmware (e.g., section 1 of the example code) that executes on a processor (e.g., processor 110, shown in FIG. 1). The thermal noise band may be (at least partly) normalized to (at least partly) center the signal at zero.

Referring to process 306, the thermal noise band is split into N sub-bands. In some embodiments, a DSP operation such as an FIR filter is used to split the thermal noise band into N sub-bands. The FIR filter (or other suitable DSP operation) may be implemented in firmware (e.g., section 1 of the example code) that executes on a processor (e.g., processor 110, shown in FIG. 1). Elements of the N sub-bands may be stored in N corresponding buffers (e.g., buffers 218, shown in FIG. 2).

Referring to process block 308, a Boolean sequence is generated using the elements of the N sub-bands. In some embodiments, the elements of the N sub-bands are compared to zero to generate the Boolean sequence. In alternative embodiments, a different operation may be used to generate the Boolean sequence. The Boolean sequence is allowed to grow to a desired length to produce a unique random private identifier. The length is arbitrary and is a function of the length of time that the compare operation runs.

Figures 4A, 4B:
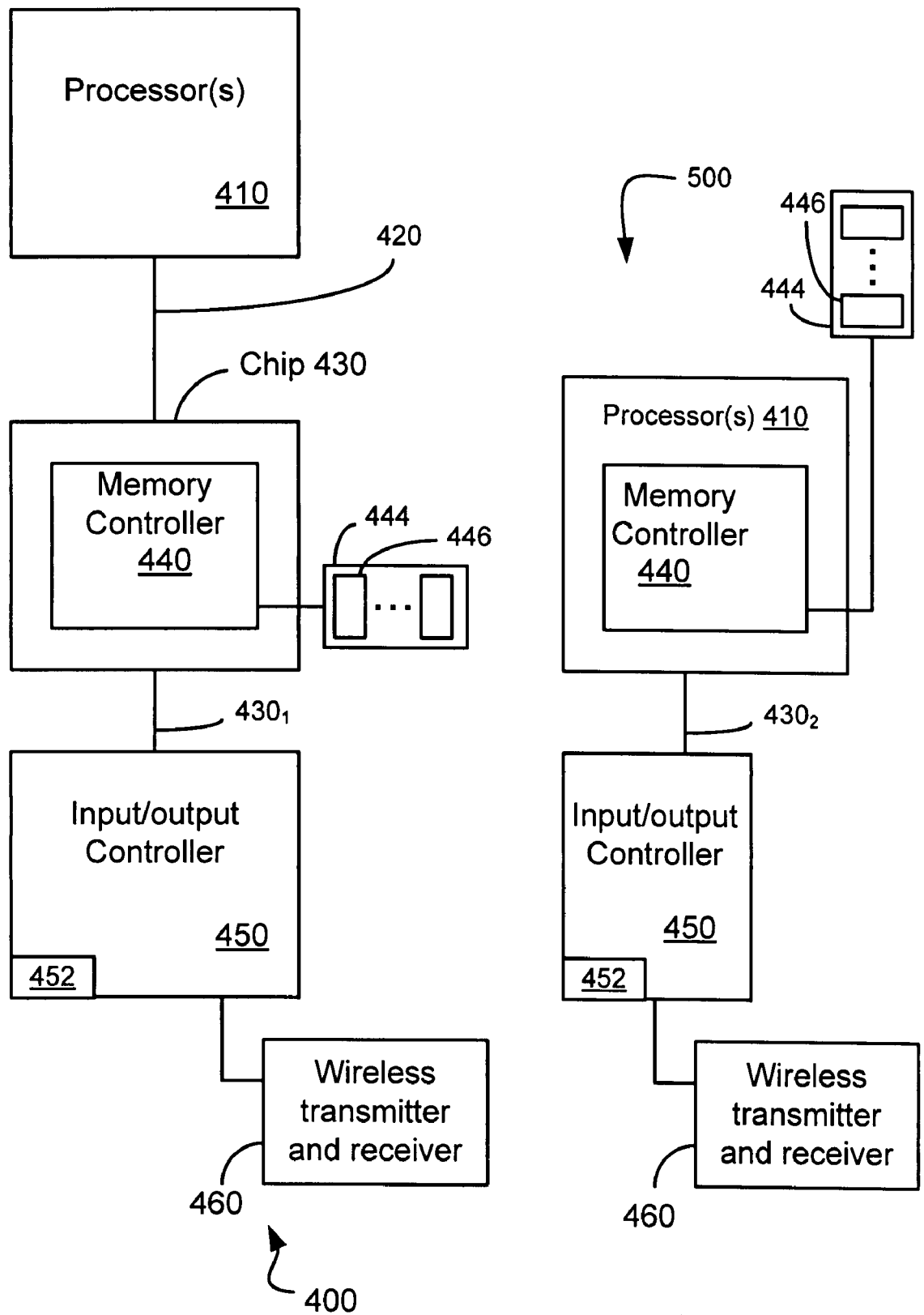
FIGS. 4A and 4B are block diagrams illustrating selected aspects of computing systems.

FIGS. 4A and 4B are block diagrams illustrating, respectively, selected aspects of computing systems 400 and 500. Computing system 400 includes processor 410 coupled with an interconnect 420. In some embodiments, the term processor and central processing unit (CPU) may be used interchangeably. In one embodiment, processor 410 is a processor in the XEON® family of processors available from Intel Corporation of Santa Clara, Calif. In an alternative embodiment, other processors may be used. In some embodiments, processor 410 may include multiple processor cores.

In one embodiment, chip 430 is a component of a chipset. Interconnect 420 may be a point-to-point interconnect or it may be connected to two or more chips (e.g., of the chipset). Chip 430 includes memory controller 440 which may be coupled with main system memory (e.g., as shown in FIG. 1). In an alternative embodiment, memory controller 440 may be on the same chip as processor 410 as shown in FIG. 4B. Memory system 444 may provide main memory for computing system 400 (and computing system 500). In the illustrated embodiment, memory system 444 includes memory devices 446.

Input/output (I/O) controller 450 controls the flow of data between processor 410 and one or more I/O interfaces (e.g., wired and wireless network interfaces) and/or I/O devices. For example, in the illustrated embodiment, I/O controller 450 controls the flow of data between processor 410 and wireless transmitter and receiver 460. In an alternative embodiment, memory controller 440 and I/O controller 450 may be integrated into a single controller. In some embodiments, I/O controller 450 includes random number generator 852. Random number generator 852 may provide a TRNG for systems having two independent oscillators providing, for example, primary and secondary clocks.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An integrated circuit comprising:
   a first oscillator;
   a second oscillator, wherein the first and second oscillators are implemented in independent hardware; and
   a random number generator coupled with the first and second oscillators, wherein the random number generator is to receive the difference of thermal noise of the first and second oscillators and to generate a random number based, at least in part, on a digital signal processing (DSP) operation, the random number generator including
   a buffer to store the measured noise, and
   a first DSP operation to flatten the power spectrum of thermal noise to obtain a near-flat spectrum of the thermal noise in the band with high ratio of thermal noise power to pseudo-stochastic process power.

2. The integrated circuit of claim 1, wherein the first oscillator determines how long oscillations of the second oscillator should be counted to form one sample of the measured noise.

3. The integrated circuit of claim 1, wherein the first oscillator is to provide a first system clock and the second oscillator is to provide a second system clock.

4. The integrated circuit of claim 1, wherein the first DSP operation is an infinite impulse response (IIR) filter.

5. The integrated circuit of claim 1, wherein the random number generator further comprises:
   a second DSP operation to split the band having high ratio of thermal noise power to pseudo-stochastic process power into N sub-bands using a digital signal processing (DSP)-based filter.

6. The integrated circuit of claim 5, wherein the second DSP operation is a finite impulse response (FIR) filter.

7. The integrated circuit of claim 5, wherein the first and second DSP operations are implemented in firmware.

8. A method comprising:
   storing a number of oscillations of a first oscillator that occurred during serial intervals defined by a second oscillator into a measured noise sequence;
   filtering the measured noise sequence, with a digital signal processing (DSP)-based filter, to create a thermal noise band, wherein filtering the measured noise sequence includes flattening a spectrum of thermal noise in a frequency band having high ratio of thermal noise power to the power of pseudo-stochastic processes;
   splitting the thermal noise band into N sub-bands using a digital signal processing (DSP)-based filter; and
   generating a sequence of binary digits based, at least in part, on a comparison of real and imaginary parts of the digital signal of the N sub-bands with zero.

9. The method of claim 8, wherein the measured noise is provided by two independent oscillators.

10. The method of claim 9, wherein each of the two independent oscillators are general purpose oscillators.

11. The method of claim 8, wherein filtering the measured noise, with the digital signal processing (DSP)-based filter comprises:
    filtering the measured oscillator noise, with a infinite impulse response (IIR) filter.

12. The method of claim 8, wherein splitting the band having high energy thermal noise into N sub-bands using the digital signal processing (DSP)-based filter comprises:
    splitting the band having high energy thermal noise into N sub-bands using a finite impulse response (FIR) filter.

13. A system comprising:
    an integrated circuit including:
      a first oscillator,
      a second oscillator, wherein the first and second oscillators are implemented in independent hardware, and
      a random number generator coupled with the first and second oscillators, wherein the random number generator is to receive thermal noise from the first and second oscillators and to generate a random number based, at least in part, on a digital signal processing (DSP) operation, the random number generator including a first DSP operation to filter the measured noise to create a thermal noise band, wherein filtering the measured noise includes flattening the spectrum of thermal noise in a frequency band having a high ratio of thermal noise power to the power of pseudo-stochastic processes; and
    a wireless transceiver coupled with the integrated circuit.

14. The system of claim 13, wherein the first DSP operation is an infinite impulse response (IIR) filter.

15. The system of claim 13, wherein the random number generator further comprises:
    a second DSP operation to split the band having high energy thermal noise into N sub-bands using a digital signal processing (DSP)-based filter.

16. The system of claim 15, wherein the second DSP operation is a finite impulse response (FIR) filter.

* * * * *